US012747381B2

(12) United States Patent
Donkers et al.

(10) Patent No.: US 12,747,381 B2
(45) Date of Patent: Sep. 29, 2026

(54) COMPACTED THERMOCHEMICAL HEAT STORAGE BODIES

(71) Applicants: Nederlandse Organisatie voor toegepast-natuurwetenschappelijk onderzoek TNO, The Hague (NL); TECHNISCHE UNIVERSITEIT EINDHOVEN, Eindhoven (NL); CALDIC BENELUX NV, Hemiksem (BE); LÜLSDORF FUNCTIONAL SOLUTIONS GMBH, Essen (DE)

(72) Inventors: Petrus Adrianus Joseph Donkers, Hilvarenbeek (NL); Olaf Clemens Gerardus Adan, Breda (NL); Hartmut Rudolf Fischer, Mierlo (NL); Hendrik Pieter Huinink, Nuenen (NL); Sebastiaan Joannes Franciscus Erich, Breda (NL); Georg Dürr, Recklinghausen (DE); Philip Heinrich Reinsberg, Rheinbach (DE); Hendrikus Theodorus Antonius Van Der Meer, Almere (NL)

(73) Assignees: Nederlandse Organisatie voor toegepast-natuurwetenschappelijk onderzoek TNO, The Hague (NL); TECHNISCHE UNIVERSITEIT EINDHOVEN, Eindhoven (NL); CALDIC BENELUX NV, Hemiksem (BE); LÜLSDORF FUNCTIONAL SOLUTIONS GMBH, Essen (DE)

( * ) Notice: Subject to any disclaimer, the term of this patent is extended or adjusted under 35 U.S.C. 154(b) by 86 days.

(21) Appl. No.: 18/556,457

(22) PCT Filed: Apr. 26, 2022

(86) PCT No.: PCT/NL2022/050222
§ 371 (c)(1),
(2) Date: Oct. 20, 2023

(87) PCT Pub. No.: WO2022/231422
PCT Pub. Date: Nov. 3, 2022

(65) Prior Publication Data

US 2024/0199938 A1 Jun. 20, 2024

(30) Foreign Application Priority Data

Apr. 26, 2021 (EP) .................................... 21170486

(51) Int. Cl.
*C09K 5/16* (2006.01)
*F28D 20/00* (2006.01)

(52) U.S. Cl.
CPC .............. *C09K 5/16* (2013.01); *F28D 20/003* (2013.01); *F28D 2020/0017* (2013.01)

(58) Field of Classification Search
None
See application file for complete search history.

(56) References Cited

U.S. PATENT DOCUMENTS 10,266,739 B2 4/2019 Bronson et al.
2019/0211188 A1 7/2019 Cuypers et al.

FOREIGN PATENT DOCUMENTS

CN 108884383 B * 2/2022 .............. C09K 5/16
DE 102019205788 A1 10/2020

(Continued)

OTHER PUBLICATIONS

DE102019205788A1 English Machine Translation (Year: 2020).*
International Search Report issued in PCT/NL2022/050222 on May 20, 2022.

(Continued)

*Primary Examiner* — Jenna M Maroney
(74) *Attorney, Agent, or Firm* — Blank Rome LLP

(57) ABSTRACT

Methods for producing shaped heat storage bodies that include a thermochemical substance, which bodies include a (Continued)

curved surface. The method includes providing a powder that includes the thermochemical substance and optionally one or more further components, in particular one or more compressing aids; and compressing the powder into the shaped bodies, using a die or a mould, preferably by direct compression. The methods further include producing shaped heat storage bodies that include a thermochemical substance, which bodies include a curved surface and a thermochemical energy storage system, that includes the heat storage bodies.

18 Claims, 7 Drawing Sheets

(56) References Cited

FOREIGN PATENT DOCUMENTS

| | | | | | |
|---|---|---|---|---|---|
| EP | 3382314 | A1 | | 10/2018 | |
| FR | 2715081 | A1 | * | 7/1995 | B01J 20/20 |
| JP | 2014230388 | A | | 12/2014 | |
| JP | 6221947 | B2 | | 10/2017 | |
| WO | WO-2014104886 | A1 | * | 7/2014 | C08K 13/02 |
| WO | WO-2015197788 | A1 | * | 12/2015 | C09K 5/063 |
| WO | WO-2018182413 | A1 | * | 10/2018 | F28D 20/003 |
| WO | WO-2022231422 | A1 | * | 11/2022 | C09K 5/16 |

OTHER PUBLICATIONS

Aarts, et al., "Diffusion Limited Hydration Kinetics of Millimeter Sized Salt Hydrate Particles for Thermochemical Heat Storage", Journal of Energy Storage 47, 2022, 14 pages.

* cited by examiner

COMPACTED THERMOCHEMICAL HEAT STORAGE BODIES

CROSS-REFERENCE TO RELATED APPLICATIONS

This application is the U.S. national stage of International Patent Application No. PCT/NL2022/050222, filed Apr. 26, 2022, which claims priority to European Application No. 21170486.1, filed Apr. 26, 2021.

The invention relates to a thermochemical energy storage system, to heat storage bodies comprising a thermochemical substance, to a method of producing heat storage bodies comprising a thermochemical substance and to a method of storing and releasing thermal energy.

Thermochemical energy storage (TCES) is a promising technology that can contribute in an increased efficiency of the use of renewable energy, and thereby to realizing a more sustainable society. TCES systems can store energy for a long period of time with a high TCES can be used to store heat generated in, e.g., domestic applications, power plants (e.g. nuclear plants, solar plants, plants make use of biomass or fossil fuels) or chemical plants, and release heat at a later moment in time, when there is a shortage or it can be used to transport heat efficiently. The energy density is high, compared to heat storage systems based on sensible and latent heats (Kariya et al, Energy Procedia (131 (2017) 395-406). Compared to sensible storage, e.g. by heating a water, thermochemical materials (TCM's) have a higher storage capacity per unit of volume. Furthermore, thermal insulation during storage is generally not needed. The working principle is based on a reversible chemical reaction, wherein for heat storage the reaction is (predominantly) driven in the endothermal direction, and for heat release the reaction is the exothermal reaction. A much used group of thermochemical substances are salts (which term is used herein in a broad sense, including oxides and hydroxides) which are reacted with a sorbent (e.g. water, ammonia, methanol or ethanol) to release heat and release the sorbent (at relatively high temperature) to store heat. The salt is usually present in the form of relatively small particles which are reactable with the sorbent, so as to allow penetration into the core of the particles. Suitable salt and sorbent based chemical reactions can for instance be presented as:

$$\text{Salt}\cdot(x+y)\text{Sorbent}+\text{heat}\rightarrow\text{Salt}\cdot x\text{Sorbent}+y\ \text{Sorbent}_{(g)}$$
(heat storage)

$$\text{Salt}\cdot x\text{Sorbent}+y\text{Sorbent}_{(g)}\rightarrow\text{Salt}\cdot(x+y)\text{Sorbent}+\text{heat}$$
(heat release)

Herein x is at least 0 and y is larger than 0.

Thus, the salt to be used for storing heat does not need to be fully desorbed. As the skilled person understand, the maximum for x, y and x+y is determined by the maximum number of water molecules that can be bound to a specific salt; the maximum values for x+y are generally known in the art for various salts, and can be e.g. 1, 2, 3, 4, 5, 6 or more than 6. Values for x and/or y can but do not need to be integers. A well-known sorbent is water. E.g. water bound to a salt is also known as 'water of crystallisation' or 'water of hydration'.

Various salts and their hydrates have reported for use in a thermochemical material. E.g. Michel et al. (Applied Energy 180:234-244, October 2016) relates to the use of $SrBr_2$. $1H_2O/SrBr_2\cdot 6H_2O$, i.e. this is an example of a reaction system wherein x=1 and y=5.

Kariya et al (Energy Procedia (131 (2017) 395-406) discusses the use of CaO and its hydroxide $Ca(OH)_2$, i.e. a reaction system, wherein x=0 and y=1. Kariya mentions that thermochemical materials have been used in a fluidized bed system for solar thermal energy storage in order to overcome problems with vapor diffusivity (hampering reaction kinetics) and low thermal conductivity of the thermochemical materials. However, fluidized beds consume energy and expand reactor scale. Kariya et al addressed the low vapour diffusity by depositing $Ca(OH)_2$ on a support, namely a diesel particle filter (providing a silicon carbide support). Although this is suitable to improve reaction kinetics, the energy storage capacity per unit of volume (E/V) is relatively low.

WO2014/104886 reports insufficient physical, mechanical and chemical stability of TCM's, which can e.g. contribute to corrosion of the environment and structural changes of the thermochemical substance itself, e.g. flaking off, coagulation, running, pulverization, fracture. In order to address these problems, it is proposed to encapsulate nano- or microbodies of the thermochemical substance in a water vapour permeable polymeric material, thereby providing a composite thermochemical material. The small particle size is said to be necessary to achieve advantageous hydration and dehydration behaviour. The examples compare the use of non-encapsulated, spray-dried $CaCl_2$) powder with encapsulated, spray-dried $CaCl_2$) powder. It is apparent that the need for a substantial amount of polymeric material (30 or 50% of the composite in the Examples) has an adverse effect on E/V. WO2014/104886 lacks details of the TCES system, wherein the composite TCM is to be used.

DE 10 2019 205788 A1 describes a thermochemical energy storage system comprising heat storage units, which heat storage units comprise a shell which shell encapsulates a granular, water and gas permeable heat storage material. EP 3 382 314 A1 describes a thermochemical storage system, comprising a thermochemical module provided with a granular thermochemical material. U.S. Pat. No. 10,266,739 B2 describes a solar energy conversion device comprising a thermal energy storage composition within a thermal storage unit. The thermal energy storage composition comprises an inner core of Al—B—Si—Fe embedded in an outer coating of silicon carbide, wherein the inner core is oxidized to generate oxides of said Al—B—Si—Fe. None of these documents disclose compressed heat storage bodies having a first curved surface side and a curved second surface side at least substantially opposite to the first surface side either.

There is a need for alternative materials for thermochemical heat storage, in particular for materials that can be used advantageously in a packed, fluidised bed or moving bed. More in particular, there is a need for materials that offer a different kinetic behaviour, an increased E/V, an increased breakthrough curve and/or that offers increased flexibility in rate at which heat is stored or released in comparison to, e.g., the materials described in the above cited prior art.

It has now surprisingly been found possible to provide a shaped thermochemical material that fulfils such need, wherein—in particular—a satisfactory kinetic behaviour, Q/V (Power energy density) and/or E/Vis feasible without being limited to thermochemical materials having small particle sizes.

Accordingly, the invention relates to heat storage bodies, typically compressed heat storage bodies, comprising a thermochemical substance, which bodies comprise a curved surface. Typically, the heat storage bodies according to the invention comprise a first surface side and a second surface side at least substantially opposite to the first surface side, wherein both of said surfaces are curved.

The invention further relates to a thermochemical energy storage system, comprising a plurality of heat storage bodies according to the invention. The heat storage bodies respectively the thermochemical energy storage system are configured to thermochemically store and release heat.

The invention further relates to a method for producing shaped heat storage bodies comprising a thermochemical substance, which bodies have a curved surface, preferably a first surface side and a second surface side at least substantially opposite to the first surface side, wherein one or both of said surface sides are non-flat (e.g., convex, concave, biconvex or biconcave), preferably bodies as defined in any of the claims 2-13, the method comprising compressing the thermochemical substance and optionally one or more further components, in particular one or more processing aids; into the shaped bodies, preferably using a die or a mould. Typically, the thermochemical substance and—if used—the one or more further components are provided in a powder form to be compressed.

The invention further relates to heat storage bodies obtainable by a method according to the invention.

The heat storage bodies respectively the thermochemical energy storage system are configured to thermochemically store and release heat.

Thus, the invention further relates to the use of a thermochemical energy storage system according to the invention for storing thermal energy or for transferring heat to an environment. Storing and releasing (to transfer the heat to the environment) is accomplished by a reversible thermochemical reaction, endothermic when storing heat and exothermic when releasing the heat.

The inventors realised that bodies having a non-flat (non-planar), in particular a curved, surface can be used to provide an effective thermochemical reactor bed for transferring heat from a (hot) gas to the bodies during heat storage and transferring heat from the bodies to a gas to be heated during heat release. Due to their geometry, the stapling of a plurality of the bodies allows for an interstitial space between the bodies defining a flow path through which a gas can pass adequately. By making use of a plurality of bodies with at least one—or preferably with at least a first and a second surface on opposite side of the bodies—side being curved, having about the same shape and size, a suitable flow path between the bodies is guaranteed. In contrast, when making use of powders of thermochemical materials or fractured thermochemical materials, size distribution and variations in shape tend to result in rather dense packing of the powder (i.e. bulk material) with a relatively low interstitial space. Thus, a higher pressure difference needs to be applied in order to maintain the same flow.

The inventors further realised that sufficient permeability for gaseous reactant (such as water vapour) can be maintained also when the bodies are compressed bodies and/or when their size is larger than e.g. the size of the composite TCM particles of WO2014/104886. For an advantageous water vapor permeability use is made of direct compression or compaction.

As illustrated in the Examples, reaction kinetics and thereby heat transfer can even be improved by making use of the heat storage bodies in accordance with the invention, compared to irregularly shaped particles, despite a larger size of the bodies of the invention.

Figure 1:
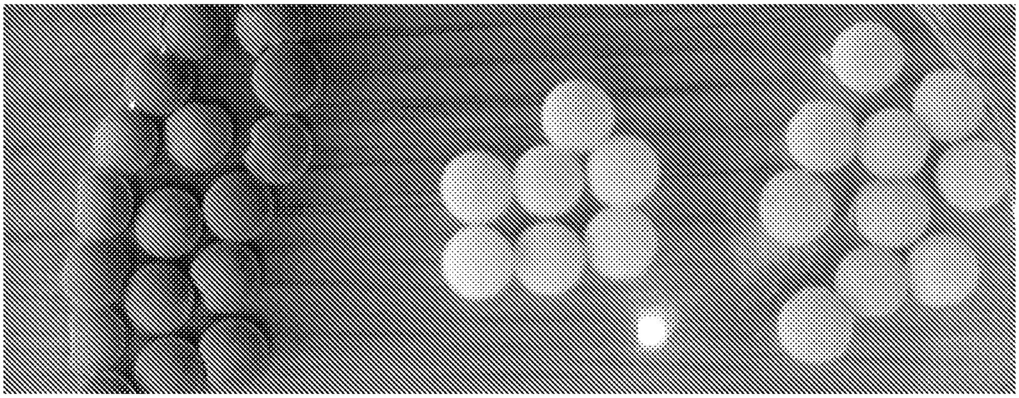
FIG. 1: Left: $K_2CO_3$ tablets; middle: $SrBr_2$ tablets; right: $KHCO_3$ tablets.

Usually, the whole surface area of a heat storage body or at least a substantial part of the total surface area is curved. In practice, a minor part of the total surface area (i.e. less than 50%, preferably less than 25%, in particular less than 10%, more in particular less than 5%) may be flat though.

The surface of the storage bodies is usually essentially free of corners. The surface of the storage bodies may be essentially free of edge-lines (line segments on the boundary of two surface sides), such as in the case of spheroid bodies or ring-shaped bodies (tori). However, one or more edge lines may be present, such as in a biconvex body (typically having one or two edge lines, although in some embodiments it can be free of edge lines). A biconcave body is another preferred example of a body that may have edge lines (typically two, if present), although biconcave bodies can also have a fully smoothly curved surface without edge-lines (e.g. resembling the shape of a red blood cell). Biconvex and biconcave bodies are in particular preferred, for the favourable gas-flow properties they provide; e.g. when a plurality of biconvex bodies or of biconcave bodies are provided in a thermochemical storage system, they provide better flow through of gas (less friction), compared to e.g. (mono)concave or (mono)convex bodies or various irregularly shaped bodies of similar dimensions under similar conditions.

In particular good results have been achieved with heat storage bodies comprising a first surface side and a second surface side at least substantially opposite to the first surface side, wherein both of said surfaces are curved (non-flat/non-planar). In an embodiment said surface sides share an edge line. In another embodiment said curved surface sides are separated from each other by an intermediate surface side; advantageously, the first curved surface side and the second curved surface side are on opposite sides of an essentially cylindrical surface side (the intermediate surface side); thereby the opposite surface sides define opposite curved base sides of a cylinder. Particularly preferred examples thereof are biconvex bodies and biconcave bodies.

In an advantageous embodiment, at least on a macroscopic level, essentially the whole surface of the heat storage bodies (i.e. said first surface side, said second surface side and—if present—any other surface side of the bodies) can be defined by having essentially all normal vectors (also known as perpendicular vectors) pointing in an outward direction from the centroid of the body and not pointing toward another part of the surface. Examples of preferred shapes with all normal vectors pointing an outward direction are illustrated in FIGS. 1, 5, 6, 7, (biconvex bodies), FIGS. 4, 11 (prolate bodies), FIG. 12 (biconvex, elongate bodies) and FIG. 16 (pillow-shaped, with two convex opposite sides). The dimensions (such as Length, Width, Height, curvature, radius, aspect ratio) in these figures are illustrative and may be varied. Particularly preferred examples of such bodies are spheroids and biconvex bodies. Thus, in such advantageous embodiment, the bodies are essentially free of concave surfaces, holes, protuberances, indents, slits etc (that are visible to the naked eye). Thus, the general visual appearance is usually that in such concave surfaces no holes, protuberances, indents, slits etc. are present, or that at most a minute part of the whole surface, typically less than 10%, preferably less than 5%, more preferably less than 1% of the surface of the body has a normal vector pointing toward another part of the surface. This is considered advantageous when providing a reactor bed in that it contributes to avoiding that a disadvantageously high part of the surfaces of bodies touch each other (reducing the desired interstitial space volume and potentially blocking parts of a passage way for a gas around the bodies). Further, this is considered advantageous to the mechanical robustness of the bodies, at least when preparing the bodies by compression. It should be noted though that on a microscopic scale, the heat storage bodies according to the invention can be porous. Porosity contributes to the rate at which a reactant, such as water vapour can diffuse into the core of the bodies, thus contributing to increased reaction rate.

Figure 13:
FIG. 13: Compacted pillows of $K_2CO_3$ with 3 wt. % graphite
Figure 14:
FIG. 14: Biconcave shapes of $K_2CO_3 \cdot 1.5H_2O$ with 2 wt. % talc

In a further advantageous embodiment, the surface can be defined by having a part of the normal vectors pointing in an outward direction from the centroid of the body and another part of the normal vectors pointing toward another part of the surface. This can be the case for, e.g., a biconcave discoid or a torus. Examples of preferred shapes wherein a part of the normal vectors point towards a part of the surface are illustrated in FIG. 14 (biconcave bodies), FIG. 15 (elongate bodies with one convex and one concave surface side) and FIG. 13. The dimensions (such as Length, Width, Height, curvature, radius, aspect ratio) in these figures are illustrative and may be varied/

Advantageously, such bodies' surface will also have an essentially smooth surface, which is essentially free from essentially free of holes, protuberances, indents, slits etc (that are visible to the naked eye), apart from those defining the shape; i.e. a biconcave discoid body according to the invention has two concavities on opposite sides but preferably is further essentially free of irregularities, such as holes, protuberances, indents, slits etc (that are visible to the naked eye); analogously a torus according to the invention will have a central hole, defining it as a torus, but its surface preferably is further essentially free of irregularities, such as holes, protuberances, indents, slits etc (that are visible to the naked eye). The substantial absence of irregularities is also for these shapes advantageous for their mechanical robustness, at least during their production, such as by compression.

It should be noted though that on a microscopic scale, the heat storage bodies according to the invention can be porous. Porosity contributes to the rate at which a reactant, such as water vapour can diffuse into the core of the bodies, thus contributing to increased reaction rate.

The heat storage bodies in accordance with the invention are typically relatively dense bodies, when compared to a heat storage body containing a powdery thermochemical material or another loosely granular material, e.g. confined in a water/gas permeable cover, e.g. as described in DE 10 2019 205788 A1. A relatively high density is typically obtained by forming the bodies by compression as described elsewhere herein, in particular by compaction, wherein a heat storage body is formed that can consist of one piece of material (a single mass), which maintains shape (at room temperature) without needing a container, e.g. a bag or capsule. Thus the heat storage body in accordance with the invention typically has a monolithic structure. Thus, the heat storage bodies can essentially consist of the thermochemical material (thermochemical substance plus optional additives such as lubricant or binder) without needing a further supportive structure to maintain shape (e.g. a separate surrounding wall structure or holding elements to maintain its shape.

The density of the heat storage bodies in accordance with the invention is typically relatively close to the specific weight of the thermochemical material (such as the specific weight of a monocrystalline piece of the material in case the thermochemical material is a crystalline material). The density of the (individual) heat storage bodies in accordance with the invention can thus in particular be in the range of about 70 to 100% of the specific weight of the thermochemical material; or—expressed as porosity—has a residual porosity of about 30 to 0%; by comparison, the density of a powder (e.g. as used prior to forming the heat storage bodies) usually has a density of about 50% or less of the specific density. As the skilled person will understand the maximally possible density in absolute terms depends to an extend on the specific weight of the composition of the material of which the bodies are made. The density of the (individual) heat storage bodies generally is in the range of about 1.5 to about 3.0 g/cm$^3$, preferably in the range of 1.5-2.5 g/cm$^3$, more preferably in the range of 1.5-2.3 g/cm$^3$. This is generally higher than for a powder of the same material, at least for salt based heat storage bodies. E.g., monocrystalline potassium carbonate has a specific weight of about 2.2-2.4 g/cm$^3$ and can be used to make compressed heat storage bodies having a density of 1.5 g/cm$^3$ and higher, whilst a typical powder of the same material has a density of only 0.6-1.1 g/cm$^3$. The relatively high density of the material is in particular advantageous to increase energy storage capacity, as more thermochemical substance is contained per volume of the heat storage bodies. Together with the geometry of the heat storage bodies, which allow favourable stapling in a packed reactor bed, this contributes to the favourable functioning of a heat storage system according to the invention. This allows a highly homogeneous reactivity throughout the reactor bed, such as a highly homogeneous hydration of the reactor bed (in case the thermochemical substance functions via hydration and dehydration).

The heat storage bodies according to the invention usually have an essentially symmetrical shape. This allows for providing a highly uniformly packed reaction bed, compared to irregularly shaped particles as, e.g. often obtained by fracturing, precipitation or agglomeration. The degree of symmetry can be chosen broadly. Usually, the heat storage bodies have at least one plane of symmetry, preferably two or more planes of symmetry. In a preferred embodiment, the heat storage bodies are point symmetrical. In an embodiment their shape is essentially spheroidal (which may be prolate or oblate). In a preferred embodiment, the heat storage bodies have circular symmetry around an axis essentially perpendicular to said first surface side and said second surface side, which surface sides are preferably both convex. Particularly good results have been achieved with such heat storage bodies, having an essentially oblate spheroidal shape. (e.g. smarties-like shape or biconvex). In a further preferred embodiment, the bodies are essentially cylindrical, wherein said first and said second surface side (of which one or both are curved, preferably convex or concave) form a top base respectively a bottom base on opposing sides of the cylinder's side. The cylinder's side is usually essentially right circular or right ellipsoidal.

Other shapes are feasible, as long as at least a substantial part of the bodies' surface is curved, in particular convex, biconvex or biconcave. The bodies are advantageously obtainable by (direct) compression, in particular by compaction. This has been found to result in bodies having a good mechanical robustness, whilst maintaining sufficient, or even advantageous permeability to a reactant for the thermochemical substance, in particular water vapour. They bodies can be for instance tablets, grains, pellets or the like.

Preferably, the heat storage bodies are anisotropic. The anisotropic heat storage bodies usually have an aspect ratio defined as shortest projected size to longest projected size in the range of 2:1 to 20:1. The higher the aspect ratio, the higher S/V; thus for an increased S/V (higher reaction kinetics), the aspect ratio preferably is at least 3:1, more preferably at least 4:1, in particular at least about 5:1. On the other hand, a higher aspect ratio may contribute to a reduced mechanical robustness or may be more of a challenge to produce on a large scale. Therefore, the aspect ratio is usually 20:1 or less, preferably 15:1 or less, more preferably 12:1 or less, in particular 10:1 or less, more in particular about 8:1 or less.

In accordance with the invention, good kinetic behaviour is feasible without having to make use of small particles, although it is not excluded to provide minute bodies. A relatively large size facilitates production and handling. Further a relatively large size is preferred for creating an advantageous interstitial space between the bodies (in terms of relative volume and/or uniform packing), when present in a (packed) reactor bed. Usually, the heat storage bodies have a longest projected size of about 1 mm or more, in particular of 2 mm or more, preferably of at least 4 mm, more preferably of at least 6 mm. An increase in size generally results in a reduction of S/V. Accordingly, for maintaining advantageous kinetics the longest projected size of the heat storage bodies usually is about 30 mm or less, preferably 20 mm or less, more preferably 15 mm or less, in particular 12 mm or less.

Usually, the heat storage bodies comprise one or more thermochemical salts thereof (including hydrates and other salts to which a sorbent is bound), in particular one or more salts that can store heat energy and release heat energy reversibly by a dehydration reaction respectively hydration reaction, e.g. as described above. The term 'salt' is used herein broadly and includes oxides and hydroxides. The salt can have a sorbent bound to it, in particular water, i.e. it can be a salt hydrate. Usually, the salt is a salt comprising one or more metal, in particular a salt comprising one or more metal ions selected from potassium, sodium, lithium, magnesium, calcium. Not all cations forming the salt need to be metals, the salt can in particular also comprise a proton. The anionic part of the salt can comprise one or more organic anions, one or more cationic anions of both. The inorganic anion is usually selected from the group consisting of (bi)carbonates, halides (Cl, Br, I, F), oxides, hydroxides, phosphates, sulphides and sulphates. The organic anion comprises usually one or more organic acid anions selected from the group consisting of the anions of organic acids having 1, 2, 3 or 4 carbon atoms, such as oxalate, formate, acetate and malonate. Organic anions having more than 4 carbon atoms may also be used, e.g. 5 or 6 carbon atoms, in particular those having two or more carboxylic functions, e.g. citrate.

The present invention in particular provides compressed (such a compacted) heat storage bodies with a good mechanical robustness, without unacceptable corrosion problems, without needing to encapsulate the bodies. The invention thus offers the possibility to provide satisfactory heat storage bodies that essentially consist of the thermochemically reactive substance (i.e. the thermochemical substance itself); in practice a minor amount of one or more processing aids may be used to facilitate its manufacture and/or one or more additives may be included to improve a property of the bodies, in particular in order to improve its mechanical robustness. Usually, the thermochemical substance content, preferably the thermochemical salt content, is about 80-100 wt. % of the weight of the heat storage bodies, preferably at least 90 wt. %, more preferably at least 95 wt. %, in particular at least 96 wt. %, more in particular at least 97 wt. %. These weight percentages usually apply to the weight of the thermochemical substance in a 'non-heat-loaded' state, i.e. in a salt-sorbent based reaction system, typically in the form of Salt·(x+y)Sorbent. Accordingly, in a 'heat-loaded' state the thermochemical substance content (such as in the form Salt·xSorbent) the thermochemical substance content usually is more than 80 wt. % of the weight of the heat storage bodies, preferably more than 90 wt. %, more preferably more than 95 wt. %, in particular more than 96 wt. %, more in particular more than 97 wt. %. Thus, the content of substances not contributing to the thermochemical reaction (if present) is advantageously low.

If desired, the heat storage bodies further comprise one or more additional components, in particular a processing aid, such as a binding agent or a lubricant. The processing aid is preferably selected from the group consisting of graphite, talc, waxes, salts of fatty acids (e.g. magnesium stearate) and polymeric materials. The additional component or components are typically used/present in an amount high enough to be effective for their intended purpose, yet low enough to prevent an unacceptable adverse effect on the functioning of the thermochemical substance. In particular, care is generally taken not to adversely affect permeability of a reactant, such as water vapour, into the core of the heat storage bodies. Further, care is generally taken that the additional component(s) are at least substantially inert with respect to reactivity with a reactant (such as the thermochemical substance itself or another reactant, such water). The skilled person will be able to select suitable additional components and suitable effective amounts based on the information disclosed herein optionally in combination with the cited prior art or common general knowledge. Generally, the total content of additional compounds is about 20 wt. % or less, based on the total weight of the bodies, preferably about 10 wt. % or less, more preferably about 5 wt. % or less, in particular about 4 wt. % or less. These weight percentages usually apply to the weight of the thermochemical substance in a ‘non-heat-loaded’ state, i.e. in a salt-sorbent based reaction system, typically in the form of Salt·(x+y)Sorbent. Accordingly, in a ‘heat-loaded’ state the total content of additional compounds is usually less than 20 wt. % or less, based on the total weight of the bodies, preferably less than 10 wt. %, more preferably less than 5 wt. %, in particular less than 4 wt. %. Due to the relatively low amount of additional components (encapsulation of the thermochemically reactive substance itself for instance is not needed), E/V is hardly affected, Further, the low amount needed has made it possible to use for instance hydrophobic lubricants, which are advantageously used as a processing aid when producing the bodies by compression, in particular compaction, to avoid sticking to the compression machinery, also when the gaseous reactant is hydrophilic, such as water vapour. Examples of such lubricants are waxes, fatty acid salts (e.g. magnesium stearate), graphite and talc. When present, the total lubricant content is usually at least 0.1 wt. %, preferably at least 0.5 wt. %, based on the total weight of the bodies at least in a ‘non-heat-loaded’ state (as described above). Usually, the total lubricant content is about 10 wt. % or less, preferably 5 wt. % or less, in particular 3 wt. % or less, at least in a ‘non-heat-loaded’ state (as described above. Usually, in a ‘heat-loaded state (as described above) the total lubricant content is less than 10 wt. %, preferably less than 5 wt. %, in particular less than 3 wt. %. A binding agent, such as a polymeric material, contributing to the mechanical robustness of the heat storage body can be included. When present, the total polymeric material content is usually at least 0.1 wt. %, preferably at least 0.5 wt. %, based on the total weight of the bodies at least in a ‘non-heat-loaded’ state (as described above). Usually, the total polymeric material content is 10 wt. % or less, preferably 5 wt. % or less, in particular 3 wt. % or less, at least in a ‘non-heat-loaded’ state (as described above. Usually, in a ‘heat-loaded state (as described above) the total polymeric material content is less than 10 wt. %, preferably less than 5 wt. %, in particular less than 3 wt. %.

Polymeric materials can, e.g., be selected from WO 2014/104886. Suitable polymers are, for example, polyacrylate, polymethacrylate, polyvinylpyrrolidone, polyurethanes, polyepoxides, poly(ethyl)methacrylate, poly(isoprene), polysiloxane (preferably vulcanised), poly (trifluoropropyl siloxane), cellulose, methylcellulose, ethylcellulose, cellulose acetate, cellulose nitrate, poly(oxy-2,6-dimethyl-1,4-phenylene), polystyrene, poly(acrylonitrile), polyvinyl alcohol (PVA) or a copolymer of these, or a mixture of these. Preferred polymeric materials are selected from the group consisting of cellulose derivates, such as methylcellulose, ethyl cellulose, cellulose acetate, cellulose nitrate, and PVA. When present, the polymeric material content of the heat storage bodies preferably at least substantially consists of one or more of said preferred polymeric materials.

The heat storage bodies advantageously provide a thermochemical reaction bed in a housing of a thermochemical energy storage device. The housing typically has one or more inlets for a gas and one or more outlets for a gas, wherein the reaction bed is situated in a passageway between said one or more inlets and said one or more outlets. This allows using the heat storage system as a flow through system. Alternatively, the inlet and outlet for gas of the heat storage device are combined, i.e. the housing comprises one opening via which gas is alternatingly introduced into and withdrawn from the housing. Such design is in particular useful when the heat storage device is a vacuum system. Advantageously, the reactor bed is at least substantially composed of heat storage bodies having about the same shape and about the same size. Preferably, essentially all the heat storage bodies of said thermochemical reaction bed are bodies having essentially the same shape, essentially the same longest projected size and essentially the same aspect ratio. This allows a highly uniform packing, even a substantially symmetrical packing, of the bed in each direction. A substantially uniform packing is advantageous because it provides a well-defined highly homogenous flow path for a gas (comprising reactant and/or for heat transfer) through the reactor bed. Thus, the invention also relates to plurality of heat storage bodies according to the invention, wherein essentially all the heat storage bodies of said plurality are bodies having essentially the same shape, essentially the same longest projected size and essentially the same aspect ratio.

The invention further relates to a method for producing shaped heat storage bodies comprising a thermochemical substance, which bodies comprise a curved surface, preferably heat storage bodies as defined herein above, the method comprising

- providing a powder comprising the thermochemical substance and optionally one or more further components, in particular one or more compressing aids; and
- compressing the powder into the shaped bodies, using a die or a mould.

The content of thermochemical substance as a percentage of the total weight of the components to be compressed is usually at least about 80 wt. %, preferably at least 90 wt. %, more preferably at least 95 wt. %, in particular at least 96 wt. %. The one or more further components are usually as defined elsewhere herein, when describing the heat storage bodies.

The optional one or more further components, when used, are usually blended with the thermochemical substance before compression.

The shaped heat storage bodies are usually formed by direct compression, preferably using a roller-compactor or a tabletting press. Direct compression is a generally known technique, wherein a powder is compressed within a die or the like to form a shaped body. In an advantageous bodies the powder is composed of particles having a (mesh) size of about 0.2 mm or less in particular of about 0.1 mm or less. The various stages of direct compression typically are as follows: rearrangement, deformation, compaction and relaxation. Use can be made for instance of a rotary tablet press, having concave punches, biconcave, convex or bi-convex punches.

The invention further relates to a method for making the thermochemical energy storage device comprising the housing and the thermochemical reaction bed in said housing according to the invention. In said method the reaction bed is advantageously made by loading at least a part of a space inside the housing configured for letting the reactant pas through with heat storage bodies prepared by a method according to the invention.

The invention further relates to a method for storing thermal energy in the thermochemical energy storage system or releasing heat from it to an environment. This can be done in a manner known per se for a particular thermochemical substance. Thus, when thermal energy is to be stored a relatively hot heat exchange medium (typically a gas, preferably air or nitrogen) is contacted with (passed through) a reactor bed comprising the heat storage body and heat is transferred from the heat exchange medium the heat storage bodies, under condition wherein a endothermic reaction takes place. Dependent on the type of desired endothermic reaction, the gas may comprise a reactant. Preferred reactants are water, ammonia, methanol and ethanol. Good results have in particular been achieved with water. When making use of a dehydration reaction, such as the heat storage reaction $Salt \cdot (x+y)H_2O + heat \rightarrow Salt \cdot xH_2O + yH_2O$, the supplied gas is preferably at least substantially dry during heat storage, in particular having a relative humidity of less than the equilibrium water vapor pressure of deliquescence of the heat storage bodies, such as the pressed salt. Thermal energy will be chemically stored in heat storage bodies, such as in the (partially) desorbed, in particular dehydrated, salt and the heat transfer medium will leave the reaction bed as a relatively cool medium. In case of the dehydration reaction, water vapour will also be withdrawn from the bed via the heat transfer medium When heat is to be released, the conditions are changed to allow the reaction to take place in the reverse direction. Thus, in case of hydration reaction in a system according to the invention a relatively cool reaction medium comprising water vapour is passed through the reactor bed, under conditions wherein water vapour is consumed by the thermochemical substance. As a result of this exothermal reaction heat is released, whereby the reaction medium is heated. The reaction medium then leaves the bed at a higher temperature. In case of a hydration reaction it will also be less humid.

The term "or" as used herein is defined as "and/or" unless it is specified otherwise, or it follows from the context otherwise.

The term "a" or "an" as used herein is defined as "at least one" unless specified otherwise or it follows from the context otherwise.

When referring to a noun (e.g. a compound, an additive, etc.) in the singular, the plural is meant to be included unless specified otherwise or it follows from the context otherwise The term "(at least) substantial(ly)" is generally used herein to indicate that it has the general character or function of that which is specified. When referring to a quantifiable feature, this term is generally used to indicated that it is more than 50%, in particular at least 75%, more in particular at least 90%, even more in particular at least 95% of the maximum of that feature.

The term 'essentially free' is generally used herein to indicate that a feature is not present or present in such a low amount that it does not significantly affect the property of the product.

In the context of this application, the term "about" means generally a deviation of 15% or less from the given value, in particular a deviation of 10% or less, more in particular a deviation of 5% or less.

In the context of this application, when something is described to be essentially the same, the means generally that the visual appearance with the naked eye is about the same to a skilled person. In particular, in quantitative terms when comparing a parameter of two or more things (in particular heat storage bodies), e.g. an aspect ratio or a size, at least a deviation of 10% or less, in particular a deviation of 5% or less, more in particular a deviation of 2.5% or less from the number average of the parameter of each of the things that are compared is considered to be essentially the same.

The skilled person is familiar with terms like 'upper', 'lower', 'middle', 'at bottom', 'near bottom', 'at top' and 'near top'. Generally these are read in relation to another, and the skilled person will be able to reduce implementation thereof to practice, based on common general knowledge, the information and citation disclosed herein.

For the purpose of clarity and a concise description, features are described herein as part of the same or separate embodiments, however, it will be appreciated that the scope of the invention may include embodiments having combinations of all or some of the features described.

The invention will now be illustrated by the following examples.

Example 1: Bodies According to the Invention Made From Different Salts and Additives; and Their Performance

$SrBr_2$ Bodies

A mix is made of $SrBr_2 \cdot 6H_2O$ with acrylic binder (Acronal; 3 wt. %), which is grinded during the processing phase into particles <100 um. This mix is pressed with a tablet press (LFA tablet press) in biconvex shaped bodies (2 mm height) with a 6 mm diameter. The convex sides of the bodies have a curvature of 0.0676 $mm^{-1}$ (corresponding to a radius of 14.8 mm).

The produced biconvex bodies are shown in FIG. 1 (middle).

$K_2CO_3$ Bodies

A mix is made of $K_2CO_3$ $1.5H_2O$ with graphite (1 wt. %), which is grinded during the processing phase into particles <100 um. This mix is pressed with a tablet press (LFA tablet press) in biconvex shaped bodies (varying heights) with a 6 mm diameter. The convex sides of the bodies have a curvature of 0.0676 $mm^{-1}$ (corresponding to a radius of 14.8 mm). The produced biconvex bodies are shown in FIG. 1 (left).

$KHCO_3$ Bodies

A mix is made of $KHCO_3$ with talc (2 wt. %), which is grinded during the processing phase into particles <100 um. This mix is pressed with a tablet press (LFA tablet press) in biconvex shaped bodies (2.5 mm height) with a 6 mm diameter. The convex sides of the bodies have a curvature of 0.0676 $mm^{-1}$ (corresponding to a radius of 14.8 mm). The thickness of the tablet is varied for the different bodies.

The produced biconvex bodies are shown in FIG. 1 (right).

Effect Kinetics with Particle Geometry

Figure 2:
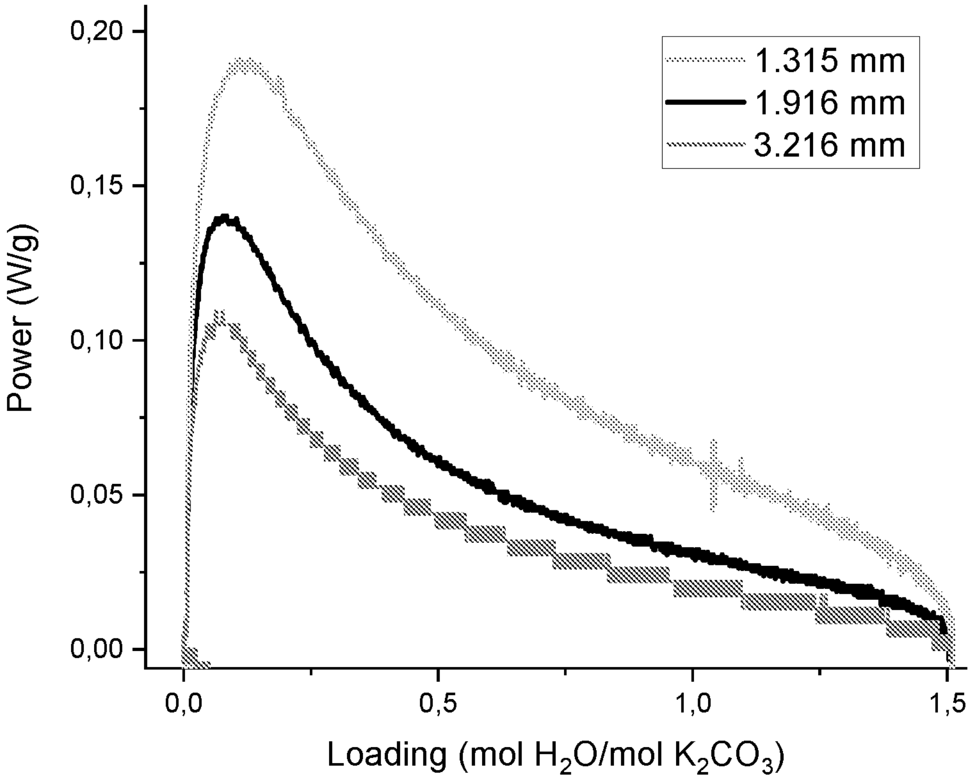
FIG. 2: The kinetics measured of 6 mm biconvex particles with different tablet heights plotted against the loading (conversion) of the tablet.

With help of the geometry of the tablet, the kinetics of a tablet can be varied. How thinner shortest diffusion distance ('tablets' height') is, how faster the resulted kinetics is of a tablet. The kinetics of the different tablets (6 mm diameter, biconvex) are measured at a thermal gravimetric analyser (TGA), with 10.7 mbar water vapor pressure at 25° C. FIG. 2 shows the results for the bodies made from $K_2CO_3$ and graphite, but an analogous effect of tablet height on kinetics is experienced with bodies made from another thermochemical heat storage material.

Effect Shape on Bed Permeability

Figure 6:
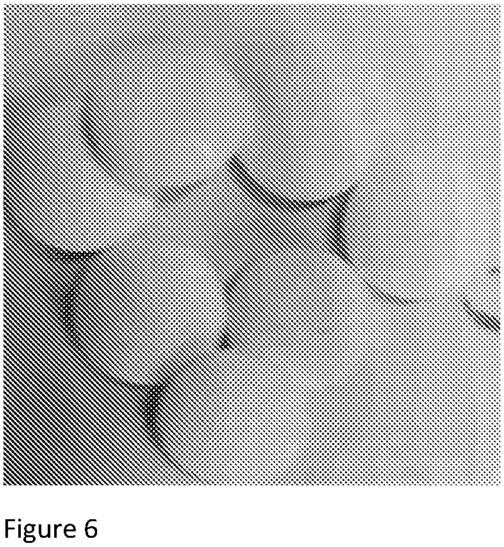
FIG. 6: biconvex bodies according to the invention (12 mm diameter)
Figure 7:
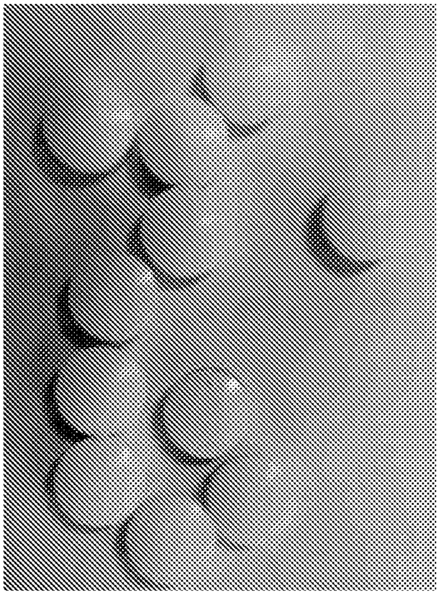
FIG. 7: biconvex bodies according to the invention (6 mm diameter)
Figure 8:
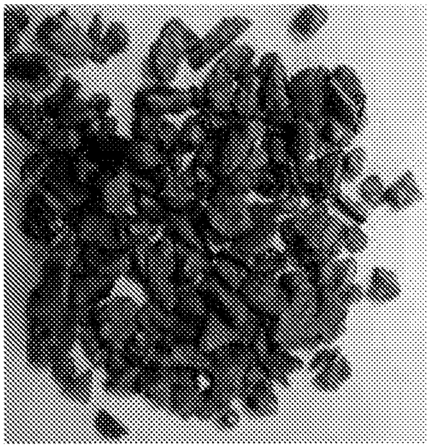
FIG. 8: reference particles

The shape and orientation of the tablets affect the bed permeability. Three different shapes are tested, whereby one shape is tested in two directions. The orientation of the shapes are as follows:

A: D12×H3 mm biconvex; short axis parallel with flow direction (FIG. 6)

B: D12×H3 mm biconvex—long axis parallel with flow direction (FIG. 6)

Figure 17:
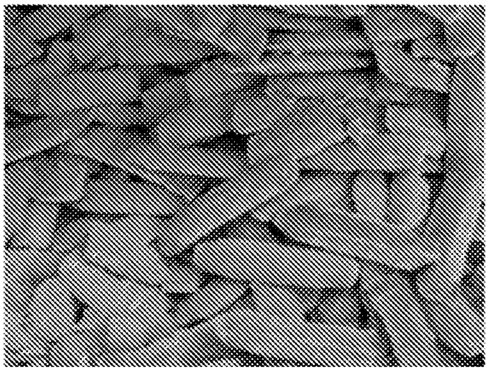

C: L40×W12×H4 mm bars—long axis parallel with flow direction (FIG. 17)

D: Pillow shapes (L6×W6×H5 mm)—random filled (FIG. 13)

Figure 3:
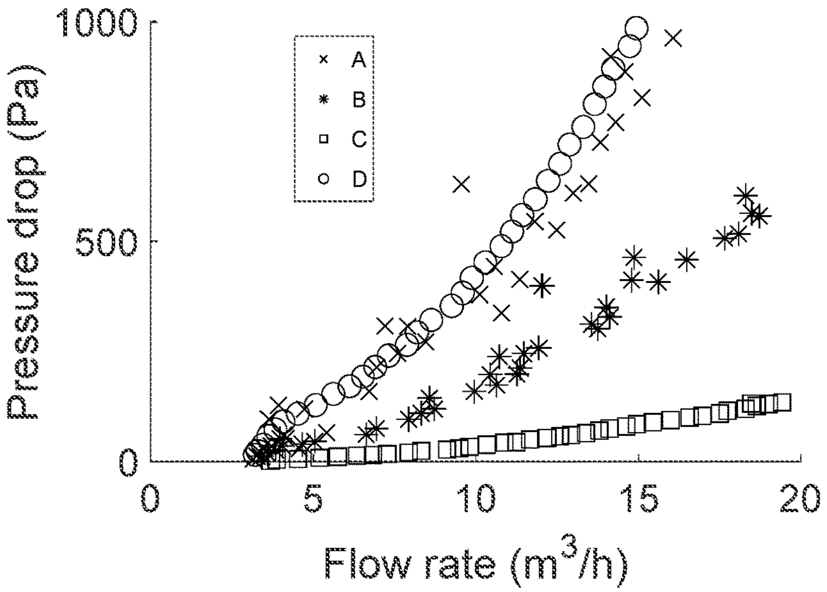
FIG. 3: Permeability of bodies with different heights.

The permeability is measured with help of a cylindrical tube of 68 mm diameter and 120 mm height. The pressure drop is measured over the bed with different flow rates. Results are shown in FIG. 3 for tablets made from the bodies made from $K_2CO_3$ and graphite, but an analogous effect of tablet height on kinetics is experienced with bodies made from another thermochemical heat storage material.

Selection of the tablet geometry and orientation is an important factor for the bed performance.

Example 2: Elongated Bodies (Opal Shape)

Figure 4:
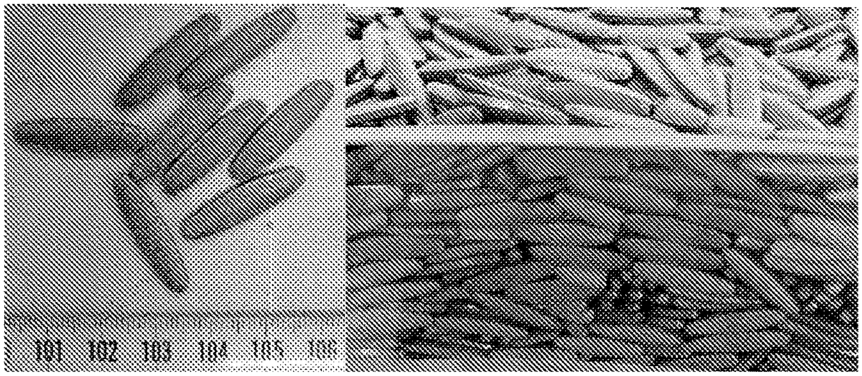
FIG. 4: Elongated bodies according to the invention (prolate)

A mix is made of $K_2CO_3$ $1.5H_2O$ with graphite (1 wt. %), which is grinded during the processing phase into particles <100 um. This mix is pressed with a tablet press in 24×6 mm (L×W) shaped bodies (height of 3.5 mm). The resultant bodies are shown in FIG. 4.

Figure 11:
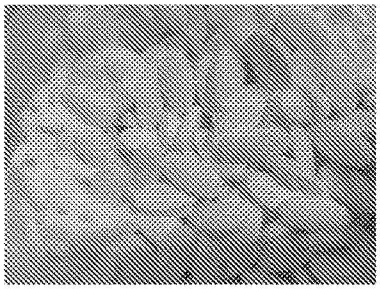
FIG. 11: Opal shapes formed of $K_2CO_3$ with talc

FIG. 11 shows another example of compacted oval shaped bodies; these are formed of $K_2CO_3$ with talc.

These elongated tablets easily order themselves in one direction. This simplifies the filling procedure and the ability to steer the permeability of the bed.

Example 3: Bi-Convex Shapes

Figure 5:
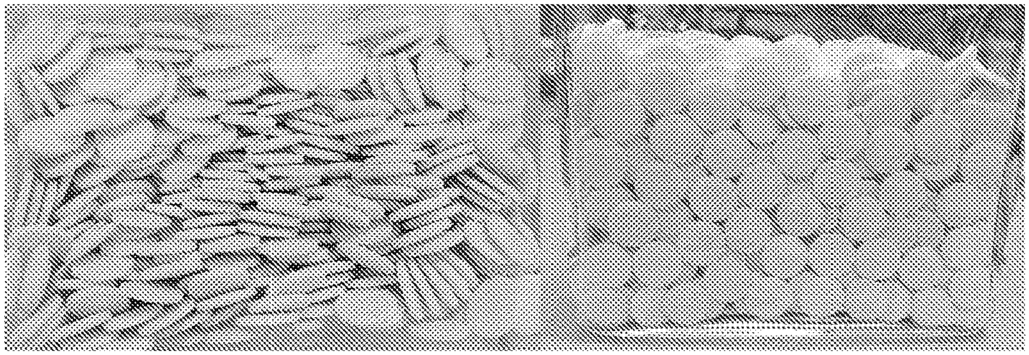
FIG. 5: relatively thin biconvex discs according to the invention.

A mix is made of $KHCO_3$ with talc (1 wt. %), which is grinded during the processing phase into particles <100 um. This mix is pressed with a tablet press in biconvex shape (16 mm diameter, 3.5 mm height) with a curvature of 0.0167 $mm^{-1}$ corresponding to a 60 mm radius). The resultant bodies are shown in FIG. 5. The large size helps orientation of the tablets when filling the TCM bed. FIG. 5 further illustrates that a relatively small radius of the convex sides suffices to provide a low area of contact between the individual bodies, contributing to an advantageous space between the bodies for heat storage/heat release applications.

Example 4: Pillow-Shaped Bodies

Figure 16:
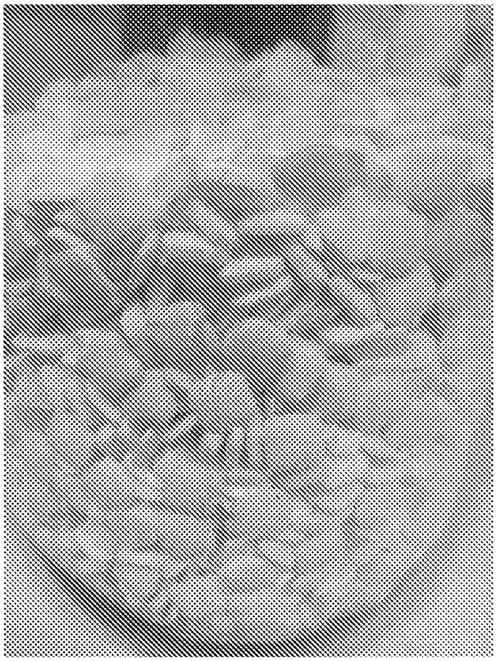
FIG. 16: Pressed pillow-shaped bodies FIG. 17; Compacted $K_2CO_3$ with 3 wt. % graphite: L40×W12×H4 mm bars The heat storage bodies are generally macroscopic bodies, i.e. visible with the naked eye. They are generally solid (crystalline, semi-crystalline or amorph) at 25° C. When referring herein to aspects defining the shape, these should in particular be understood to define shape on a macroscopic level unless specifically stated otherwise or unless this clearly follows out of the context.

FIG. 16 shows pressed pillow-shaped bodies, made by compaction.

Example 5: Comparison with Irregularly Shaped Particles

Biconvex bodies according to the invention (6 mm or 12 mm diameter) are made by compaction, using a thermochemical salt hydrate (a potassium carbonate) and graphite. Reference particles having a diameter of 3-5 mm diameter are made from the same material, by fracturing bar-shaped bodies thereof (L40×W12×H4 mm bars), which bodies also had been formed by compaction. The reference particles were separated into two batches. One of the reference batches was stabilised with a coating (ethyl cellulose).

The bodies according to the invention and the reference particles are each loaded as a reaction bed into a heat storage system of the same dimensions.

The pressure drop of a gas flow through the beds is lowest in the bed filled with bodies according to the invention having a 12 mm diameter (ca. 0.8 kPa after 10 runs), followed by the bed filled with bodies according to the invention having a 6 mm diameter (ca 1.1 kPa after 10 runs); for both the coated and the uncoated reference particles, the pressure drop is ca. 4 kPa after 10 runs.

Figure 9:
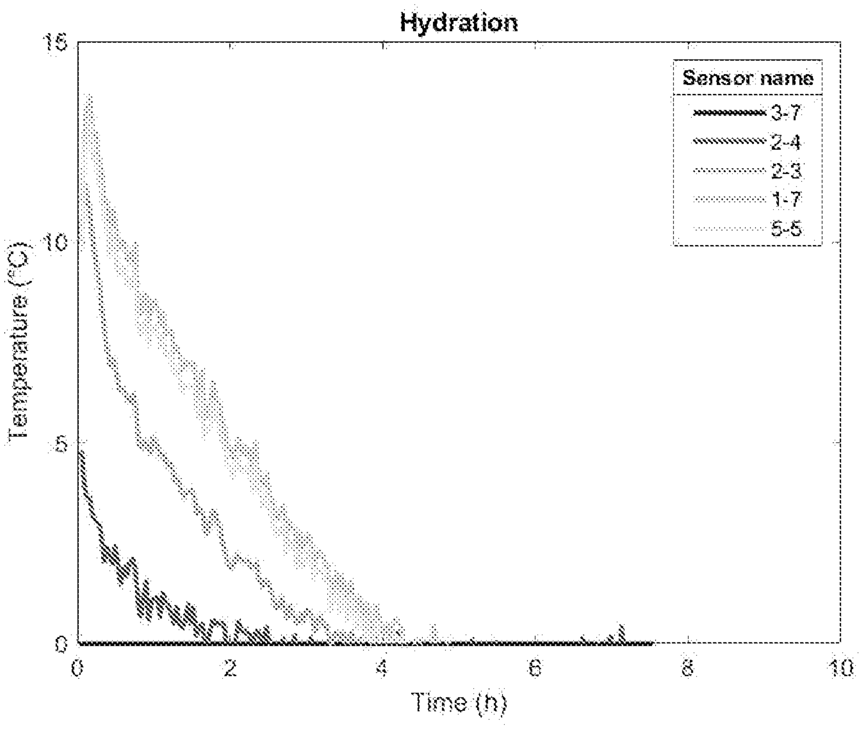
FIG. 9: graph showing reaction kinetics of tablets according to the invention
Figure 10:
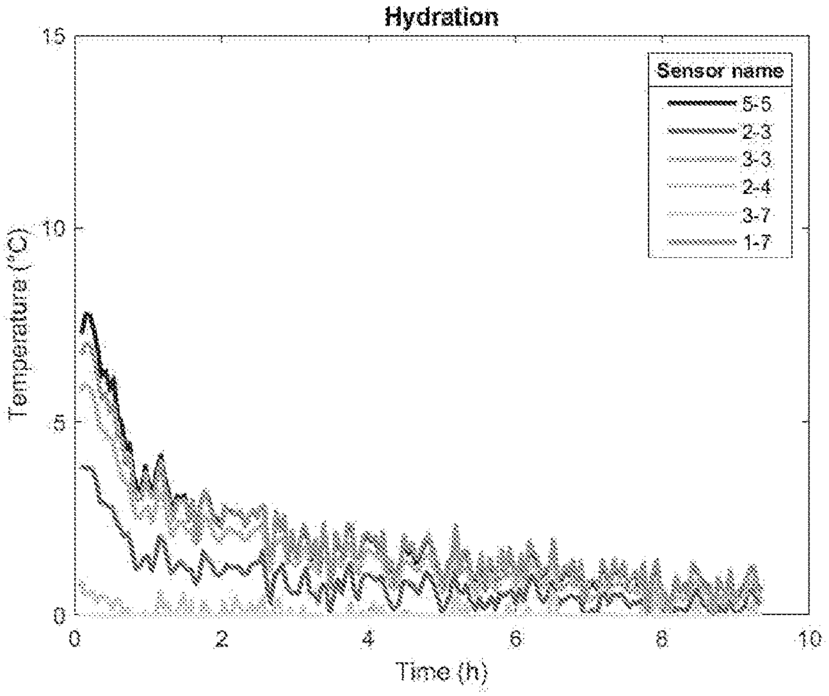
FIG. 10: graph showing reaction kinetics of reference particles

Reaction kinetics are illustrated in FIG. 9 (bodies according to the invention 12 mm diameter) and FIG. 10 (non-coated reference particles). It is shown that a higher peak temperature is achieved with the bodies according to the invention and that heat is released quicker (complete transfer after about 4 hours) than with the irregularly shaped reference particles, despite the larger size of the bodies, and thus a lower surface to volume ratio.

Example 6 Further Examples of Different Shapes

Figure 12:
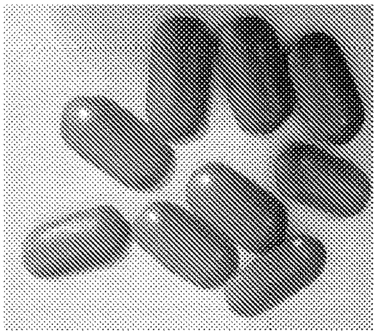
FIG. 12: Compacted $K_2CO_3$ with 3 wt. % graphite with two convex surfaces
Figure 15:
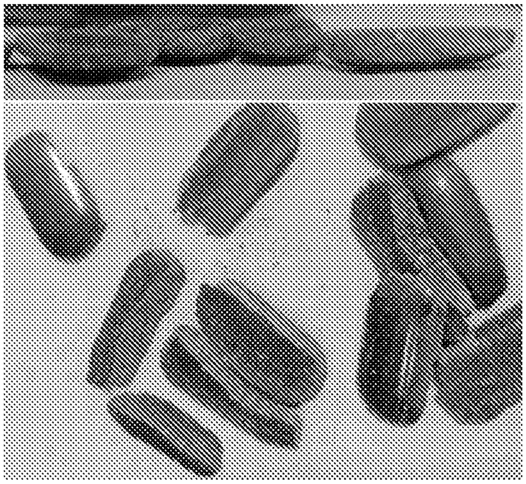
FIG. 15: Compacted $K_2CO_3$ with 3 wt. % graphite with 1 concave and 1 convex surface

Various bodies of different shapes were made by dry-compression of a powder of $K_2CO_3$ with 3 wt. % graphite or 2 wt. % talc as starting material. FIG. 12 shows bodies with two convex surfaces. FIG. 13 shows compacted pillow-shaped bodies. FIG. 14 shows biconcave discoids. FIG. 15 shows compacted bodies with one flat surface and one convex surface. FIG. 17 shows compacted elongate bodies: L40×W12×H4 mm bars.

The invention claimed is:

1. A thermochemical energy storage system, comprising compressed heat storage bodies, said bodies comprising a thermochemical substance wherein said bodies comprise a first surface side and a second surface side at least substantially opposite to the first surface side, wherein both of said surfaces are curved, wherein the heat storage bodies are monolithic structures and have a density in a range of 1.5-3.0 $g/cm^3$, wherein the density of the heat storage bodies is in a range of about 70 to 100% of the specific weight of the thermochemical material.

2. The thermochemical energy storage system according to claim 1, wherein the heat storage bodies are anisotropic bodies having an aspect ratio defined as shortest projected size to longest projected size in a range of 2:1 to 20:1.

3. The thermochemical energy storage system according to claim 1, wherein the heat storage bodies have at least one plane of symmetry, and/or wherein the heat storage bodies are point symmetrical.

4. The thermochemical energy storage system according to claim 1, wherein the heat storage bodies have a rotational axis orthogonal to said first surface side and said second surface sides.

5. The thermochemical energy storage system according to claim 1, wherein said bodies are biconvex discoidal bodies.

6. The thermochemical energy storage system according to claim 1, wherein said bodies are biconcave discoidal bodies.

7. The thermochemical energy storage system according to claim 1, wherein—in addition to said first surface side and said second surface side—the bodies further comprises an essentially cylindrical surface side and the at least substantially opposing surface sides are on opposite sides of said cylindrical surface side, thereby defining a curved base side of the heat storage bodies.

8. The thermochemical energy storage system according to claim 1, wherein the heat storage bodies have a longest projected size in a range of 2 mm to 20 mm.

9. The thermochemical energy storage system according to claim 1, wherein the compressed bodies are compacted bodies.

10. The thermochemical energy storage system according to claim 1, wherein the heat storage bodies comprise a thermochemical substance selected from the group consisting of thermochemical salts.

11. The thermochemical energy storage system according to claim 1, wherein the thermochemical substance content of the heat storage bodies is at least 90 wt. % of the total weight of the bodies.

12. The thermochemical energy storage system according to claim 1, wherein the heat storage bodies further comprise an additive.

13. The thermochemical energy storage system according to claim 1, wherein essentially all the heat storage bodies have essentially the same shape, essentially the same longest projected size and essentially the same aspect ratio.

14. The thermochemical energy storage system according to claim 1, further comprising a housing containing a thermochemical reaction bed comprising the heat storage bodies, the housing having one or more openings configured for introducing gas into the thermochemical reaction bed and/or withdrawing gas from the reaction bed, wherein the reaction bed is situated in a passage way between said one or more inlets and said one or more outlets.

15. A method for producing shaped heat storage bodies comprising a thermochemical substance, which bodies have a first surface side and a second surface side at least substantially opposite to the first surface side, wherein both of said surfaces are curved and the bodies form the thermochemical energy storage system of claim 1, the method comprising:

providing a powder comprising the thermochemical substance; and compressing the powder into the shaped bodies, using a die or a mould, by direct compression, whereby the powder subsequently undergoes (i) rearrangement, (ii) deformation, iii) compaction and (iv) relaxation.

16. The method according to claim 15, wherein the powder further comprises one or more processing aids selected from the group consisting of binding agents and lubricants.

17. The method according to claim 15, wherein the powder further comprises one or more processing aids selected from the group consisting of graphite, talc, waxes, salts of fatty acids and polymeric materials.

18. The thermochemical energy storage system according to claim 1, wherein the heat storage bodies are compacted heat storage bodies.

* * * * *